United States Patent Office 3,558,520
Patented Jan. 26, 1971

3,558,520
COMPLEXES OF Cu, Ag AND Au WITH ORGANOALUMINUMS AS OLEFIN REACTION CATALYSTS
Donald H. Kubicek and Ernest A. Zuech, Bartlesville, Okla., assignors to Phillips Petroleum Company, a corporation of Delaware
No Drawing. Continuation-in-part of application Ser. No. 635,693, May 3, 1967. This application Mar. 28, 1968, Ser. No. 717,024
Int. Cl. C07c *3/62*
U.S. Cl. 252—429
14 Claims

ABSTRACT OF THE DISCLOSURE

A catalyst active for the olefin reaction including olefin disproportionation comprising a compound of copper, silver, or gold complexed with a selected complexing agent (e.g., triphenylphosphine) and combined with an organoaluminum compound (e.g., methylaluminum sesquichloride).

---

This application is a continuation-in-part of our copending application Ser. No. 635,693, filed May 3, 1967 now abandoned.

This invention relates to the conversion of olefins and to a homogeneous coordination complex catalyst for such conversion. In one aspect, this invention relates to the olefin reaction. In another aspect, it relates to the conversion of olefins to other olefins having different molecular weights. In still another aspect, it relates to a novel homogeneous, coordination complex catalyst system.

The term "olefin reaction," as used herein, is defined as a process for the catalytic conversion over a catalyst of a feed comprising one or more ethylenically unsaturated compounds to produce a resulting product which contains at least ten percent by weight of product compounds, which product compounds can be visualized as resulting from at least one primary reaction, as defined below, or the combination of at least one primary reaction and at least one unsaturated bond isomerization reaction, and wherein the sum of the compounds contained in said resulting product consisting of hydrogen, saturated hydrocarbons, and compounds which can be visualized as formed by skeletal isomerization but which cannot be visualized as formed by one or more of the above-noted reactions, comprises less than twenty-five percent by weight of the total of said resulting product. Feed components and unsaturated bond isomers thereof are not included in the resulting product for the purposes of determining the above-noted percentages.

In the olefin reaction, as defined above, the primary reaction is a reaction which can be visualized as comprising the breaking of two existing unsaturated bonds between first and second carbon atoms and between third and fourth carbon atoms, respectively, and the formation of two new unsaturated bonds. Said first and second carbon atoms and said third and fourth carbon atoms can be in the same or different molecules.

The olefin reaction according to this invention is illustrated by the following reactions:

(1) The disproportionation of an acrylic mono- or polyene having at least three carbon atoms into other acrylic mono- or polyenes of both higher and lower number of carbon atoms; for example, the disproportionation of propylene yields ethylene and butenes; the disproportionation of 1,5-hexadiene yields ethylene and 1,5,9-decatriene;

(2) The conversion of an acrylic mono- or polyene having three or more carbon atoms and a different acrylic mono- or polyene having three or more carbon atoms to produce different acrylic olefins; for example, the conversion of propylene and isobutylene yields ethylene and isopentane;

(3) The conversion of ethylene and an internal acrylic mono- or polyene having four or more carbon atoms to produce other olefins having a lower number of carbon atoms than that of the acrylic mono- or polyene; for example, the conversion of ethylene and 4-methylpentene-2 yields 3-methylbutene-1 and propylene;

(4) The conversion of ethylene or an acrylic mono- or polyene having three or more carbon atoms and a cyclic mono- or cyclic polyene to produce an acrylic polyene having a higher number of carbon atoms than that of any of the starting materials; for example, the conversion of cyclooctene and 2-pentene yields 2,10-tridecadiene; the conversion of 1,5-cyclooctadiene and ethylene yields 1,5,9-decatriene;

(5) The conversion of one or more cyclic mono-, or cyclic polyenes to produce a cyclic polyene having a higher number of carbon atoms than any of the starting materials; for example, the conversion of cyclopentene yields 1,6-cyclodecadiene, and continued reaction can produce still higher molecular weight materials;

(6) The conversion of an acrylic polyene having at least seven carbon atoms and having at least five carbon atoms between any two double bonds to produce acrylic and cyclic mono- and polyenes having a lower number of carbon atoms than that of the feed; for example, the conversion of 1,7-octadiene yields cyclohexane and ethylene; or (7) The conversion of one or more acrylic polyenes having at least three carbon atoms between any two double bonds to produce acrylic and cyclic mono- and polyenes generally having both a higher and lower number of carbon atoms than that of the feed material; for example, the conversion of 1,4-pentadiene yields 1,4-cyclohexadiene and ethylene.

New catalytic processes have been discovered, in recent years, for the conversion of olefins to other olefinic products including products of both higher and lower molecular weight whereby olefins of relatively low value are converted into olefins of higher value. Such conversions have been carried out with heterogeneous catalysts such as those comprising compounds of metals such as molybdenum or tungsten which are usually associated with solid support materials such as alumina or silica. It has now been found that these olefin conversions can be carried out in a substantially homogeneous state using, as catalysts, selected coordination complexes of copper, silver or gold in combination with suitable organo metal catalytic adjuvants to produce olefins of increased value including solid products, for example, rubber suitable for the manufacture of tires, wire coating, footwear and other It is an object of this invention to provide a method and a homogeneous catalyst system for the conversion of olefin hydrocarbons. It is also an object of this invention to provide a homogeneous catalyst comprising a coordination complex of copper, silver or gold, together with an aluminum containing catalytic adjuvant for the olefin reaction. Still another object is to provide a method for converting olefins to other olefins accordings to the olefin reaction. The provision of a homogeneous coordination catalyst of copper, silver or gold together with an aluminum-containing catalytic adjuvant for converting olefins to other olefins of higher and lower number of carbon atoms is yet another object of this invention. Other aspects, objects and advantages of the invention will be apparent to one skilled in the art upon study of the disclosure including the detailed description of the invention.

According to the process of this invention, olefinic compounds are converted to other olefinic compounds by contact under conditions suitable to disproportionate an olefin into other olefins having higher and lower number of carbon atoms, with a catalyst system which forms on admixing, under catalyst formation conditions, components comprising:

(a) the copper, silver, or gold-containing reaction product formed by the admixture of a copper, silver, or gold compound, such as a salt of an organic acid having up to 20 carbon atoms or an inorganic acid, preferably a halogen acid, with at least one complexing agent represented by the formula:

$R_3Q$, $R_3QO$, $R_2Q$—$QR_2$, CO, NO, NOX,

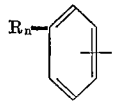

radical-containing compounds, $RCOCH_2COR$, $RNR_2^1$, $R_2^1N$—$R^2$—$NR_2^1$,

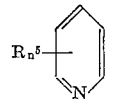

R—S—R; $R^3S$; $R^5(COOH)_m$
$(CHR^4$=$CR^4$—$CH_2)$ radical-containing compounds; or

wherein each R is a saturated aliphatic or aromatic hydrocarbon radical, including alkoxy- and halo-substituted radicals, having up to 20 carbon atoms; Q is phosphorus, arsenic, or antimony; $R^1$ is hydrogen or R; $R^2$ is a divalent saturated aliphatic or aromatic hydrocarbon radical having up to 20 carbon atoms; $R^3$ is a divalent saturated or ethylenically unsaturated hydrocarbon radical having from 3 to 10 carbon atoms; $R^4$ is hydrogen or a methyl radical; $n$ is 0, 1, 2 or 3; $m$ is 1 or 2; $R^5$ is an aromatic, saturated aliphatic, or ethylenically unsaturated aliphatic hydrocarbon radical having up to 20 carbon atoms; $n$ is 0–5; X is a halogen, with (b) a catalytic adjuvant selected from (1) $R_aAlX_b$,
(2) a mixture of (1) compounds,
(3) a mixture of one or more $R_aAlX_b$ or $AlX_3$ compounds with one or more compounds represented by the formula $R_c^1M^1X_d$, or
(4) a $AlX_3$ compound, wherein each R is a saturated aliphatic or aromatic organic radical, including alkoxy- and halo-substituted radicals, having up to 20 carbon atoms, preferably an alkyl radical having up to 10 carbon atoms; each X is a halogen; each $M^1$ is a metal of Group I-A, II-A, II-B, or III-A; each $R^1$ is selected from hydrogen or R; $a$ is 1, 2 or 3; $b$ is 0, 1 or 2, the sum of $a$ and $b$ being 3; $c$ is 1, 2 or 3, $d$ is 0, 1 or 2, the sum of $c$ and $d$ being equal to the valence of $M^1$; and when the adjuvant is (1) and acyclic olefins are converted, $b$ is preferably 1 or 2.

The Group I-A, II-A, II-B and III-A metals are referred to as in the Periodic Table of Elements appearing in Handbook of Chemistry and Physics, Chemical Rubber Co., 45th edition (1964), page B-2.

Some exampls of compounds of $R_aAlX_b$ and $AlX_3$ compounds are methylaluminum dichloride, dimethyl aluminum fluoride, methylaluminum sesquichloride, ethylaluminum dichloride, ethylaluminum sesquichloride, aluminum trichloride, di(2 - ethylhexyl)aluminum bromide, phenylaluminum dichloride, aluminum tribromide, di(3-ethoxypropyl)aluminum bromide, benzylaluminum diiodide, dieicosylaluminum bromide, and the like, and mixtures thereof.

Some examples of compounds of the formula $R_c^1M^1X_d$ are phenyllithium, t-butylpotassium, methylsodium, benzylrubidium, lithium hydride, anthrylcesium, lithium aluminum hydride, ethylberyllium hydride, lithium boronhydride, methylcadmium chloride, diethylzinc, dicyclohexymercury, dipropylzinc, triethylaluminum, methylgallium dibromide, trieicosylaluminum, triethylindium, di(12-chlorododecyl)-aluminum chloride, triisopropylthallium, dimethylcalcium, dimethylstrontium, diethylbarium, and the like, and mixtures thereof.

The preferred adjuvants, or (b) catalyst components, are (1) or (2).

Some examples of suitable copper, silver, or gold compounds which can be used in the preparation of the (a) component of the present invention are: $Cu_2Cl_2$, $Cu_2Br_2$, $Cu_2I_2$, $Cu_2F_2$, AgCl, AgBr, AgI, AgF, $AuCl_3$, $AuBr_3$, AuF, $AuI_3$, CuCN, CuSCN, Cu(acetate)$_2$, Ag laurate, Au stearate, Cu(benzoate)$_2$, $Cu_2(SnCl_3)_2$, $Cu_2(CN)_2$, $Au(CN)_2$ AuCl, AuBr, AuCN, AgCN, and AgCNS.

Some examples of suitable complexing agents or ligand-forming materials for use in the present invention are: triphenylphosphine oxide, tetramethyldiphosphine, tetrabenzyldistibine, trimethylphosphine, tri-n-butylphosphine, tri-n-decylphosphine, tri-n-eicosylphosphine, methyldi-n-octylphosphine, tricyclohexylphosphine, triphenylphosphine, tribenzylphosphine, triethylarsine, triisopropylarsine, tri - n - pentadecylarsine, diethyl-n-tridecylarsine, tricyclopentylarsine, tri(4 - cyclohexylbutyl)arsine, diethylphenylarsine, tri(3,6 - diphenyloctyl)arsine, tri-t-butylstibine, tri - n - nonylstibine, tri(6,8 - di-n-butyldecyl) stibine, tri(3,5 - dimethylcyclohexyl)stibine, methyldicyclohexylstibine, tri(2,4,6 - triethylphenyl)stibine, methyldi(4 - dodecylphenyl)stibine, trimethylamine, tri - tert-butylamine, tri - n - decylamine, trieicosylamine, tricyclohexylamine, triphenylamine, tribenzylamine, ethyldi-n-tridecylamine, diisopropyl - 4 - tolylamine, tri(6-phenylhexyl)amine, tri(3,5 - di-n-heptylcyclohexyl)amine; and isopropyldiphenylamine; sodium cyclopentadienylide, lithium 2 - methylcyclopentadienylide, NO, NOCl, NOI, NOBr, NOF, cyclopentylamine, dibutylamine, N,N,N',N'-tetramethylethylenediamine, N,N' - dibenzylethylenediamine,3 - (diethylamino)propylamine, 4 - vinylpyridine, pyridine, 4 - (2 - ethylhexyl)pyridine, 2,2'-bipyridyl, butyl sulfide, phenyl sulfide, thiophene, 2,5 - diethylthiophene, allyl bromide, methallyl chloride, crotyl iodide, tetrakis-(2 - methyl - 2 - butenyl)tin, tetramethallyltin, tetraallyltin, acetic acid, oxalic acid, benzoic acid, malonic acid, lauric acid, acetylacetone, 1,3-diphenyl-1,3-propanedione, and the like, and mixtures thereof.

Some I-B metal containing coordination complexes which can be used as component (a) of the invention can be represented by the formula $[(L)_eM_fZ_g]_x$ wherein M is copper, silver or gold; each Z is halogen, $SnCl_3$, CN, SCN, or a carboxylic acid radical having up to 20 carbon atoms per molecule; and each (L) is selected from $R_3Q$, $R_3QO$, $R_2Q$—$QR_2$, CO, NO,

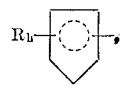

$[(RCO)_2CH]$, $RNR_2^1$, $R_2^1$—$R^2$—$NR_2^1$,

, R—S—R, , $R(COO)_m$ $(CHR^4$—$CR^4$—$CH_2)$ and

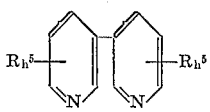

$e$ is 1–5; $f$ is generally 1 but can be 2 or higher particularly when M is copper; $g$ is 1–6; and the number of (L) and Z groups present in the complex is not greater than the number required for the metal to achieve the closed shell electronic configuration of the next higher atomic number inert gas; $x$ is a number representing the polymeric state of the complex and is generally 1, 2 or 3; and wherein $n$, $m$, Q, R, $R^1$, $R^2$, R, $R^4$, $R^5$ and $n$ are as defined earlier.

Some examples of complexes which are suitable for use as component (a) are:

(triphenylphosphineoxide)$_3$Cu$_2$Cl$_2$,
(triphenylphosphine)$_3$Cu$_2$Cl$_2$,
(triphenylphosphine)AuCl,
[(triphenylphosphine)AgBr]$_x$,
(tributylphosphine)$_3$Cu$_2$Cl$_2$,
(tricyclohexylstibine)$_3$Cu$_2$Cl$_2$,
(tribenzylarsine)$_3$Cu$_2$Br$_2$,
(tridodecylphosphine)AuCl,
[tri(2-ethylhexyl)stibine]AuI,
[(tricyclopentylarsine)AgCl]$_x$,
(pyridine)CuBr$_2$,
(m-toluidine)CuBr$_2$,
(aniline)CuCl$_2$,
(aniline)CuCl$_2$,
(o-phenylenediamine)CuCl$_2$,
(pyridine)$_2$Cu$_3$Cl$_6$,
(triphenylphosphine)$_2$AuCl$_2$,
(triphenylstibine)AuCl,
(triphenylphosphine)$_2$Au$_3$CN,
(pyridine)(triphenylphosphine)$_2$AgCl,
(triphenylphosphine)$_3$AgCl,
(triphenylphosphine)$_3$AgI, and the like, and mixtures thereof.

The formula $[(L)_eM_fZ_g]_x$ is used herein to identify the product obtained by admixture of a copper, silver or gold compound with at least one complexing agent. Thus, if the metal compound is gold chloride and the complexing agent is triphenylphosphine, the reaction product is considered to be triphenylphosphine gold chloride. It should be understood, however, that the catalytic agent which has activity for the olefin reaction conversion is the product resulting from the admixture of the metal compound and the complexing agent, and the aluminum-containing compound whether or not the components are present in the complex as indicated in the formula.

The (a) component of the catalyst system is the product obtained by combining a copper, gold, or silver compound with 1 or more suitable ligand-forming materials. These materials are simply combined under conditions of time and temperature which permit the complex to be formed. In general, excessively high temperatures at which the reagents tend to decompose, or excessively low temperatures, at which the reagents tend to crystallize or otherwise tend to become unreactive, should be avoided. The molar proportion of transition metal salt to the selected ligand-former can be in the range of from about 0.1:1 to about 10:1, preferably from about 0.5:1 to about 2:1. The products are obtained by combining these ingredients at a temperature preferably in the range of from about −25 to about 130° C., more preferably 0 to about 60° C., for a time in the range of from a few seconds up to about 24 hours, preferably in the presence of a diluent in which the components of the admixture are at least partially soluble. Any convenient diluent such as carbon tetrachloride, methylene chloride, xylene, cyclohexane, isooctane, benzene, chlorobenzene, and the like, can be used for this purpose. Any order of addition can be used. Such product need not be isolated but the mixture can be used directly in the formation of the catalyst system. In general, the (a) component of the catalyst system is fully prepared before contact is made with the (b) component or adjuvant.

The molar proportion of the (b) component to the (a) component, to form the catalyst system of the present invention, will generally be in the range of from about 0.1:1 to 20:1, preferably from about 1:1 to about 10:1.

The catalyst is prepared simply by combining the (a) component and the (b) component under conditions of time and temperature which permit the catalytically active mixture to be formed, avoiding excessively high temperatures at which some of the reagents tend to decompose or excessively low temperatures at which some of the reagents tend to crystallize or otherwise tend to become inactive. This combination occurs very readily and, in general, the components can be mixed at any convenient temperature preferably within the range of −80 to about 100° C., preferably 0 to 60° C., for a few seconds or for several hours in the presence of a diluent in which both the components are at least partially soluble. Any convenient diluent such as benzene, cyclohexane, toluene, chlorobenzene, methylene chloride, ethylene chloride, and the like, can be used for this purpose. Halogenated diluents are generally preferred. The mixing of the two catalyst components is carried out in the substantial absence of air or moisture, generally in an inert atmosphere. After the catalytic reaction mixture is formed, it need not be isolated but can be added directly to the olefin reaction zone as a dispersion in its preparation solvent. If desired, the catalyst components can be separately added, in any order, to the reaction zone, either in the presence or absence of the feed olefin.

Olefins applicable for use in the process of the invention are non-tertiary, non-conjugated, acylic mono- and polyenes having at least 3 carbon atoms per molecule including cycloalkyl, cycloalkenyl, and aryl derivatives thereof; cyclim mono- and polyenes having at least 4 carbon atoms per molecule including alkyl and aryl derivatives thereof; mixtures of the above olefins; and mixtures of ethylene and the above olefins. Many useful reactions are accomplished with such acyclic olefins having 3–30 carbon atoms per molecule and with such cyclic olefins having 4–30 carbon atoms per molecule. Non-tertiary olefins are those olefins wherein each carbon atom, which is attached to another carbon atom by means of a double bond, is also attached to at least one hydrogen atom.

Some specific examples of acyclic olefins suitable for reactions of this invention include propylene, 1-butene, 2-butene, 1 pentene, 2-pentene, 1-hexene, 1,4-hexadiene, 2-heptene, 1-octene, 2,5-octadiene, 2-nonene, 1-dodecene, 2-tetradecene, 1-hexadecene, 1-phenylbutene-2, 4-octene, 3-eicosene, 3-hexene, 1,4-pentadiene, 1,4,7-dodecatriene, 4-methyl-4-octene, 4-vinylcyclohexene, 1,7-octadiene, 1,5-eicosadiene, 2-triacontene, 2,6-dodecadiene, 1,4,7,10,13-octadecapentaene, 8 - cyclopentyl-4,5-dimethyl-1-decene, 6,6-dimethyl-1,4-octadiene, and 3-heptene, and the like, and mixtures thereof.

Some specific examples of cyclic olefins suitable for the reactions of this invention are cyclobutene, cyclopentene, cycloheptene, cyclooctene, 5-n-propylcyclooctene, cyclodecene, cyclododecene, 3,3,5,5-tetramethylcyclononene, 3,4,5,6,7-pentaethylcyclodecene, 1,5-cyclooctadiene, 1,5,9-cyclododecatriene, 1,4,7,10-cyclododecatetraene, 6-methyl-6-ethylcyclooctadiene-1,4, and the like, and the mixtures thereof.

It will be understood by those skilled in the art that not all olefinic materials will be converted by the present invention with equal effectiveness. The reactions described in the present invention are equilibrium-limited reactions and, barring the selective removal of one or more products from the reaction zone, the extent of conversion will depend upon the thermodynamics of the specific systems observed. Thus, conversion of olefinic materials to give specific products can be thermodynamically favored while the reverse reaction is very slow and ineffective. For example, 1,7-octatriene is converted to equilibrium-favored products such as cyclohexene and ethylene. The reverse reaction of ethylene and cyclohexene, correspondingly, goes very poorly. Other well known factors, such as stearic hindrance in bulky molecules, significantly and sometimes drastically affect the rates of reaction of some olefins such that extremely long reaction times are required.

The reaction of symmetrical monoolefins with themselves, to give different olefin products, will sometimes proceed very slowly, requiring some double bond migration to take place before the reaction will proceed at a significant rate. For the same reason, the conversion of a mixture of ethylene and a 1-olefin, for example, can be more difficult than the conversion of ethylene with an internal olefin, some double bond isomerization also being required in this instance.

It has also been found that branching also retards the olefin reactivity in proportion to its propinquity to the reacting double bond. Analogously, the presence of inert polar substituents on the olefinic compound appears tolerable only if located some distance from the double bond.

Thus, the present invention is directed primarily to the conversion of those olefins or combination of olefins which are capable of undergoing the olefin reaction to a significant degree when contacted with the catalyst of the present invention under reaction conditions suitable for effecting the olefin reaction.

Presently preferred olefinic feed compounds are those contained in the following classes:

(1) Acyclic monoolefins, including those with aryl, cycloalkyl, and cycloalkenyl substituents, having 3 to 20 carbon atoms per molecule with no branching closer than about the 3-position and no quaternary carbon atoms or aromatic substitution closer than the 4-position to the double bond, and mixtures of such unsubstituted acyclic monoolefins. Some examples of these are: propylene, pentene-1, pentene-2, butene-1, butene-2, 3-methylbutene-1, hexene-2, octene-4, nonene-2, 4-methylpentene-1, decene-3, 8-ethyldecene-2, dodecene-4, vinylcyclohexane, 4-vinylcyclohexene, eicosene-1, and the like.

(2) A mixture of ethylene and one or more acyclic unsubstituted internal monoolefins of (1). Some examples of such mixtures are: ethylene and butene-2, ethylene and pentene-2, ethylene and hexene-3, ethylene and heptene-3, ethylene and 4-methylpentene-2, ethylene and octene-4, ethylene and dodecene-4, and the like.

(3) Acyclic, non-conjugated polyenes having 5 to about 20 carbon atoms per molecule, containing from 2 to about 4 double bonds per molecule and having at least one double bond with no branching nearer than the 3-position and no quaternary carbon atom nearer than the 4-position to that double bond, or mixtures of such polyenes. Some examples are: 1,4-pentadiene, 1,5-hexadiene, 1,7-octadiene, 2,6-decadiene, 1,5,9-dodecatriene, 4-methylheptadiene-1,6, 1,7-octadiene, 1,6-octadiene, and the like.

(4) A mixture of ethylene and one or more acyclic polyenes of (3) which contain at least one internal double bond. Some examples are: ethylene and 1,6-octadiene, ethylene and 1,5-decadiene, and the like.

(5) Cyclopentene.

(6) Monocyclic and bicyclic monoolefins having 7 to 12 ring carbon atoms, including those substituted with up to 3 alkyl groups having up to about 5 carbon atoms, with no branching closer than the 3-position and with no quaternary carbon atoms closer than the 4-position to that double bond, and mixtures of such olefins including mixtures with cyclopentene. Some examples are: cycloheptene, cyclooctene, 4-methylcyclooctene, 3-methyl-5-ethylcyclodecene, cyclononene, cyclododecene, norbornene, and the like.

(7) A mixture of one or more of the monocyclic olefins of (6) with either ethylene or with one or more unsubstituted acyclic monolefins of (1). Some examples of these are: ethylene and cycloheptene, ethylene and cyclooctene, propylene and cyclodecene, pentane-2 and cyclooctene ethylene and cyclodecene, and the like.

(8) Monocyclic and bicyclic non-conjugated polyenes having from 5 to about 12 ring carbon atoms, including those substituted with up to 3 alkyl groups having up to about 5 carbon atoms each, having at least one double bond with no branching closer than the 3-position and with no quaternary carbon atoms closer than the 4-position to that double bond, and mixtures thereof. Some examples of these are: 1,5-cyclooctadiene, 1,5,9-cyclododecatriene, 1,4-cycloheptadiene, norbornadiene, and the like.

(9) A mixture of one or more monocyclic polyenes of (8) with one or more acyclic 1-olefins having from 2 to about 10 carbon atoms, having no branching nearer than the 3-position and no quaternary carbon atoms nearer than the 4-position to the double bond. Some examples of these are: 1,5-cyclooctadiene and ethylene, 1,5,9-cyclododecatriene and ethylene, 1,5,9-cyclododecatriene and pentene-1, and the like.

(10) Polar group-substituted olefinic compounds of classes (1) through (9) containing from about 5 to about 20 carbon atoms per molecule in which the polar group, such as a halogen atom, is sufficiently removed from the active double bond (generally, no nearer to the double bond than the 5-position) so as not to interfere with the reaction, and mixtures with unsubstituted members of class (1). Some examples are: 5-chloropentene-1, a mixture of pentene-2 and 5-chloropentene-1, and the like.

According to the process of the invention, the olefins or mixture of olefins to be converted is contacted with the catalyst system at any convenient temperature, avoiding excessively high temperatures at which some of the reagents tend to decompose, or excessively low temperatures at which some of the reagents tend to crystallize or otherwise tend to become inactive. The process will often be carried out at a temperature preferably within the range of from about —30 to about 150° C., more preferably from 0 to about 75° C., at any convenient pressure which is sufficient to maintain a liquid phase. The conversion can be carried out in the presence of any diluent such as that used for the catalyst preparation, if desired. Diluents are not essential but are generally preferred and such diluents can include saturated aliphatics and aromatics such as cyclohexane, xylene, isooctane and the like, and halogenated derivatives thereof. The time of contact will depend upon the desired degree of conversion and the catalysts and olefins utilized, but will, generally, be in the range of from about 0.1 minute to 24 hours, preferably 5 to 120 minutes. The proportion of catalyst composition to olefin feed in the reaction zone will generally be in the range of from about 0.001–100 millimoles of the Group IB metal for each mole of olefin in the reaction zone.

Any conventional contacting technique can be used for the olefin conversion, and batchwise or continuous operation can be utilized. After the reaction period, the products can be separated and/or isolated by conventional means such as by fractionation, crystallization, adsorption, and the like. Unconverted feed material or products not in the desired molecular weight range can be recycled to the conversion zone. If desired, the catalyst can be destroyed by treatment with a sufficient amount of water or alcohol prior to the separation of the products, to inactivate the catalyst. Otherwise, after separation of the products, the catalyst can be recycled to the reaction zone. Separation of products can be accomplished by distillation, crystallization, evaporation, and the like.

EXAMPLE I

Disproportionation of heptene-2 over (triphenylphosphine)$_3$Cu$_2$Cl$_2$/methylaluminum sesquichloride or ethylaluminum dichloride A dry 7-oz. pressure bottle was charged with 0.1 g. (triphenylphosphine)$_3$Cu$_2$Cl$_2$ and 10 ml. chlorobenzene. The bottle was flushed with nitrogen and the water-white solution was cooled in an ice-water bath. To this was added 0.2 ml. of methylaluminum sesquichloride and 10 ml. of heptene-2. This reaction mixture was stirred for 2 hours at 0° C. and for an additional 2 hours at 80° C. After hydrolysis, the reaction mixture contained the disproportionation products, butene and decene. The conversion of heptene-2 was about 0.2 percent.

In another similar run in which the methylaluminum sesquichloride was replaced by ethylaluminum dichloride, 5 ml. of pentene-2 was contacted with 0.05 g. of the same copper compound and 0.2 ml. of ethylaluminum dichloride in 5 ml. chlorobenzene in a 16-hour reaction at room temperature. Analysis showed that about 0.6 percent of the pentene-2 was converted to the disproportionation products, butene and hexene.

EXAMPLE II

Disproportionation of pentene-2 over (triphenylphosphine)AuCl/methylaluminum sesquichloride (Triphenylphosphine)AuCl was prepared by the reaction of AuCl$_3$ with two equivalents of triphenylphosphine in ethyl alcohol.

Into a dry 7-oz. pressure bottle were added 0.05 gram of (triphenylphosphine)AuCl, 5 ml. of ethylene chloride and a magnetic stirring bar. The system was flushed with dry nitrogen, 5 ml. of pentene-2 and 1 ml. of a molar solution of methylaluminum sesquichloride in chlorobenzene were added. The mixture was stirred for 60 hours at room temperature, hydrolyzed with about an equal volume of water and analyzed by G.L.C. (gas-liquid chromatography).

The reaction mixture, excluding ethylene which was vented, was found to contain 0.7 weight percent butene and 2.2 weight percent hexene.

EXAMPLE III

Disproportionation of pentene-2 over [(triphenylphosphine)AgBr]$_x$ ethylaluminum dichloride Into a dry 7-oz. pressure bottle was added 0.5 gram of [(triphenylphosphine)AgBr]$_x$, a magnetic stirrer and 10 ml. of phenyl chloride. The system was flushed with dry nitrogen and 1 ml. of a 1 molar solution of ethylaluminum dichloride in phenyl chloride was added. The mixture was stirred at room temperature for 1 hour and 5 ml. of pentene-2 were added and stirring was continued for 18 hours. A sample was removed, hydrolyzed, and analyzed by G.L.C. The chromatogram showed the presence of butenes and hexene. The remainder of the mixture was stirred for 6 hours at 80° C., hydrolyzed and analyzed by G.L.C. More disproportionation products were indicated.

In the practice of the process of this invention, the feed olefins, catalysts and operating conditions disclosed include combinations wherein solid, rubbery materials are produced; for example, if a propylene feed and a suitable aluminum-containing adjuvant such as an organoaluminum dihalide or an organoaluminum sesquihalide are used, a solid, rubbery material is produced having characteristics of ethylene-propylene rubber. This rubbery material is useful in the manufacture of tires, wire coating, footwear and other industrial products.

The homogeneous catalysts of this invention can be deposited upon a suitable support or carrier and used in the olefin reaction, preferably where the olefin feed is in the vapor phase. Catalyst supports include solid, inorganic or organic materials conventionally used as catalyst supports or carriers such as silica, alumina, silica-alumina, titania, boria, zeolites, ion exchange resins, solid polymers containing functional groups such as those prepared by the polymerization of 4-vinylpyridine, vinyl dimethylphosphine, and the like.

The support can be impregnated with the homogeneous catalyst by wetting the support with a solution of the catalyst in a solvent which is then evaporated. The support can also be impregnated with either the (a) or (b) component and the remaining component can be added later. For example, the solid support material can be impregnated with the (a) component and the resulting composite conveniently stored until required. Just prior to use, the composite can be treated with the (b) component, or, if the reaction is in the liquid phase, the (b) component can simply be added to the reaction zone. Among impregnating solvents suitable are relatively low-boiling organic solvents such as pentane, methylene chloride, cyclohexane, and the like. The amount of homogeneous catalyst added to the support will be from 0.1 to about 30 weight percent of the total of the catalyst and support. If the support is to be activated by calcination, it is usually activated prior to the impregnation step.

Impregnation and evaporation conditions in preparing the catalyst are conventional, being carried out at temperatures up to about 150° C. Operating conditions in carrying out the olefin reaction are the same for the supported and the nonsupported homogeneous catalyst systems.

That which is claimed is:

1. A catalyst consisting essentially of:
   (a) the reaction product formed by the admixture of a copper, silver, or gold halide, cyanide, thiocyanide or salt of a hydrocarbon carboxylic acid having up to 20 carbon atoms with at least one complexing agent capable of complexing with the copper, silver, or gold metal represented by the formula:

$R_3Q$, $R_3QO$, $R_2Q$—$QR_2$, $CO$, $NO$, $NOX$ unsubstituted and R-substituted cyclopentadienyl salts of alkali metals, $RNR_2^1$, $R_2^1N$—$R^2$—$NR_2^1$,

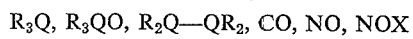, R—S—R; 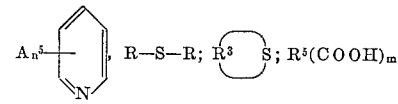; $R^5(COOH)_m$ halogen or tin compounds containing the radical $(CHR^4$=$CR^4$—$CH_2)$, or

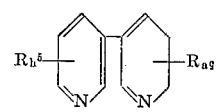

wherein each R is a saturated aliphatic or aromatic hydrocarbon radical having up to 20 carbon atoms including alkoxy- and halo-substituted derivatives thereof; Q is phosphorus, arsenic, or antimony; $R^1$ is hydrogen or R; $R^2$ is a divalent saturated aliphatic or aromatic hydrocarbon radical having up to 20 carbon atoms; $R^3$ is a divalent saturated or ethylenically unsaturated hydrocarbon radical having from 3 to 10 carbon atoms; $R^4$ is hydrogen or a methyl radical; $h$ is 0, 1, 2 or 3, $m$ is 1 or 2; $n$ is 0–5; $R^5$ is an aromatic, saturated aliphatic, or ethylenically unsaturated aliphatic hydrocarbon radical having up to 20 carbon atoms, X is a halogen, with
   (b) a catalytic adjuvant which is
     (1) $R_aAlX_b$,
     (2) a mixture of (1) compounds,
     (3) a mixture of one or more $R_aAlX_b$ or $AlX_3$ compounds with one or more compounds represented by the formula $R_c^1M^1X_d$, or
     (4) a $AlX_3$ compound, wherein each R and $R^1$ is as defined above; each X is a halogen; each $M^1$ is a metal of Group IA, IIA, IIB, or IIIA; $a$ is 1 or 2, $b$ is 1 or 2, the sum of $a$ and $b$ being 3; $c$ is 1, 2 or 3, $d$ is 0, 1 or 2, the sum of $c$ and $d$ being equal to the valence of $M^1$; and wherein the molar proportion of $(b)$ to $(a)$ is in the range of from about 0.1:1 to about 20:1.

2. A catalyst which forms on admixtrue of
(a) a metal complex represented by the formula $[(L)_eM_fZ_g]_x$ wherein M is copper, silver, or gold, each Z is halogen, $SnCl_3$, CN, SCN, or a hydrocarbon carboxylic acid radical having up to 20 carbon atoms; each (L) is $R_3Q$, $R_3QO$, $R_2Q$—$QR_2$, CO, NO,

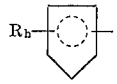

$RNR_2^1$, $R_2^1N$—$R^2$—$R_2^1$,

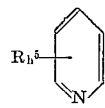

R—S—R,

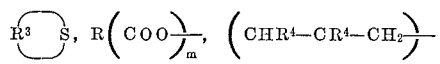

wherein $e$ is 1–5; $f$ is 1, 2, or 3; $g$ is 1–6; the number of (L) and Z groups present in the complex is not greater than the number required for the metal to achieve the closed shell electronic configuration of the next higher atomic number inert gas; $x$ is 1, 2 or 3; $h$ is 0, 1, 2 or 3; $m$ is 1 or 2; $n$ is 0–5; Q is phosphorus, arsenic or antimony; R is a saturated aliphatic or aromatic hydrocarbon radical having up to 20 carbon atoms including alkoxy- and halo-substituted derivatives thereof; $R^1$ is hydrogen or R; $R^2$ is a divalent saturated aliphatic or aromatic hydrocarbon radical having up to 20 carbon atoms; $R^3$ is a divalent saturated or ethylenically unsaturated hydrocarbon radical having from 3 to 10 carbon atoms; $R^4$ is hydrogen or a methyl radical; and $R^5$ is an aromatic, saturated aliphatic, or ethylenically unsaturated aliphatic hydrocarbon radical having up to 20 carbon atoms; and
(b) an aluminum-containing catalytic adjuvant which is
  (1) $R_aAlX_b$,
  (2) a mixture of (1) compounds,
  (3) a mixture of one or more $R_aAlX_b$ or $AlX_3$ compounds with one or more compounds represented by the formula $R_c^1M^1X_d$, or
  (4) a $AlX_3$ compound,
wherein each R and $R^1$ is as defined above; each X is a halogen; each $M^1$ is a metal of Group IA, IIA, IIB, or IIIA; $a$ is 1 or 2, $b$ is 1 or 2, the sum of $a$ and $b$ being 3; $c$ is 1, 2 or 3, $d$ is 0, 1 or 2, the sum of C and $d$ being equal to the valence of $M^1$; and wherein the molar proportion of $(b)$ to $(a)$ is in the range of from about 0.1:1 to about 20:1.

3. The composition of claim 2 wherein the $(b)$ component is (1) or (2).

4. The composition of claim 1 wherein the $(b)$ component is (1) or (2).

5. The composition of claim 1 which further includes a diluent in which the $(a)$ and $(b)$ components are at least partially soluble.

6. The composition of claim 2 which further includes a diluent in which the $(a)$ and $(b)$ components are at least partially soluble.

7. The composition of claim 6 wherein the diluent is benzene, cyclohexane, toluene, chlorobenzene, methylene chloride, or ethylene chloride.

8. The composition of claim 2 further including a solid inorganic or organic support or carrier selected from the group consisting of silica, alumina, silica-alumina, titania, boria, zeolites, ion exchange resins, a solid polymer of 4-vinylpyridine and a solid polymer of vinyl dimethylphosphine.

9. The composition of claim 1 wherein the $(a)$ component is formed by combining said copper, silver or gold compound with said complexing agent in a molar ratio of from about 0.1:1 to 10:1 at a temperature range of from about −25 to about 130° C. for a time of from a few seconds to 24 hours.

10. The composition of claim 2 wherein the $(a)$ component is combined with the $(b)$ component at a temperature range of about −80 to about 100° C. in the presence of a diluent in which each of the components are at least partially soluble.

11. The composition of claim 2 wherein the $(a)$ component is (triphenylphosphine)AuCl and the $(b)$ component is methylaluminum sesquichloride.

12. The composition of claim 2 wherein the $(a)$ component is (triphenylphosphine)AuCl and the $(b)$ component is methylaluminum sesquichloride.

13. The composition of claim 2 wherein the $(a)$ component is (triphenylphosphine)$_3Cu_2Cl_2$ and the $(b)$ component is ethylaluminum dichloride.

14. The composition of claim 2 wherein the $(a)$ component is [(triphenylphosphine)AgBr]$_x$ and the $(b)$ component is ethylaluminum dichloride, wherein $x$ is 1, 2, or 3.

References Cited

UNITED STATES PATENTS

| | | | |
|---|---|---|---|
| 2,792,334 | 5/1967 | Megverian | 252—431CarbX |
| 2,989,516 | 6/1961 | Schneider | 252—429BX |
| 2,993,035 | 7/1961 | Christman | 252—429AX |
| 3,000,837 | 9/1961 | Brachman | 252—429A |
| 3,054,754 | 9/1962 | Lasky | 252—429B |
| 3,117,938 | 1/1964 | Burrus et al. | 252—431NX |
| 3,267,076 | 8/1966 | Ishii et al. | 252—431X |
| 3,303,239 | 2/1967 | Cleary et al. | 252—429BX |
| 3,448,140 | 6/1969 | Gamlen et al. | 252—431X |
| 3,450,732 | 6/1969 | Wilke et al. | 252—431X |

PATRICK P. GARVIN, Primary Examiner

U.S. Cl. X.R.

252—428, 431; 260—80.78, 88.2, 93.1, 429, 666, 683

UNITED STATES PATENT OFFICE

CERTIFICATE OF CORRECTION

Patent No. 3,558,520          Donald H. Kubicek et al        Dated: January 26, 1

It is certified that error appears in the above-identified patent and that Letters Patent are hereby corrected as shown below:

Column 10, line 43, in the formula, "$A_n^5$" should read --- $R_n^5$ ---.

Column 10, lines 47-52, the formula which reads

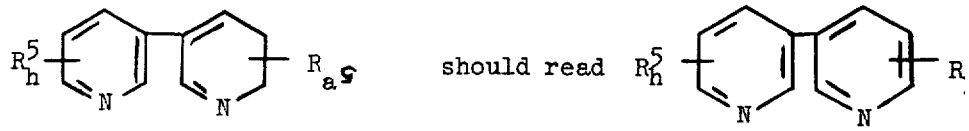

Column 11, line 18, in the first part of the formula, "$R^5$" should read "$R_h^5$" column 11, line 23, delete "$(CHR^4-CR^4-CH_2)$" and insert therefor --- $(\underline{CHR^4-CR^4-CH}$ Column 11, the formula in lines 25-29 should read:

Column 11, line 59, delete "C" and insert therefor --- c ---; column 12, lin delete "(triphenylphosphine)AuCl" and insert therefor ---(triphenylphosphine)$_3$Cu, column 12, line 41, delete "[triphenylphosphine)AgBr]$_x$" and insert therefor --- [(triphenylphosphine)AgBr]$_x$ ---.

Signed and sealed this 28th day of December 1971.

(SEAL)
Attest:

EDWARD M. FLETCHER, JR.          ROBERT GOTTSCHALK
Attesting Officer                 Acting Commissioner of Patents